No. 893,431.

PATENTED JULY 14, 1908.

J. BOWEN.
MACHINE FOR CUTTING SCREWS, &c.
APPLICATION FILED DEC. 28, 1906.

3 SHEETS—SHEET 1.

INVENTOR
James Bowen
BY
Eugene Diven
ATTORNEY

No. 893,431. PATENTED JULY 14, 1908.
J. BOWEN.
MACHINE FOR CUTTING SCREWS, &c.
APPLICATION FILED DEC. 28, 1906.
3 SHEETS—SHEET 2.
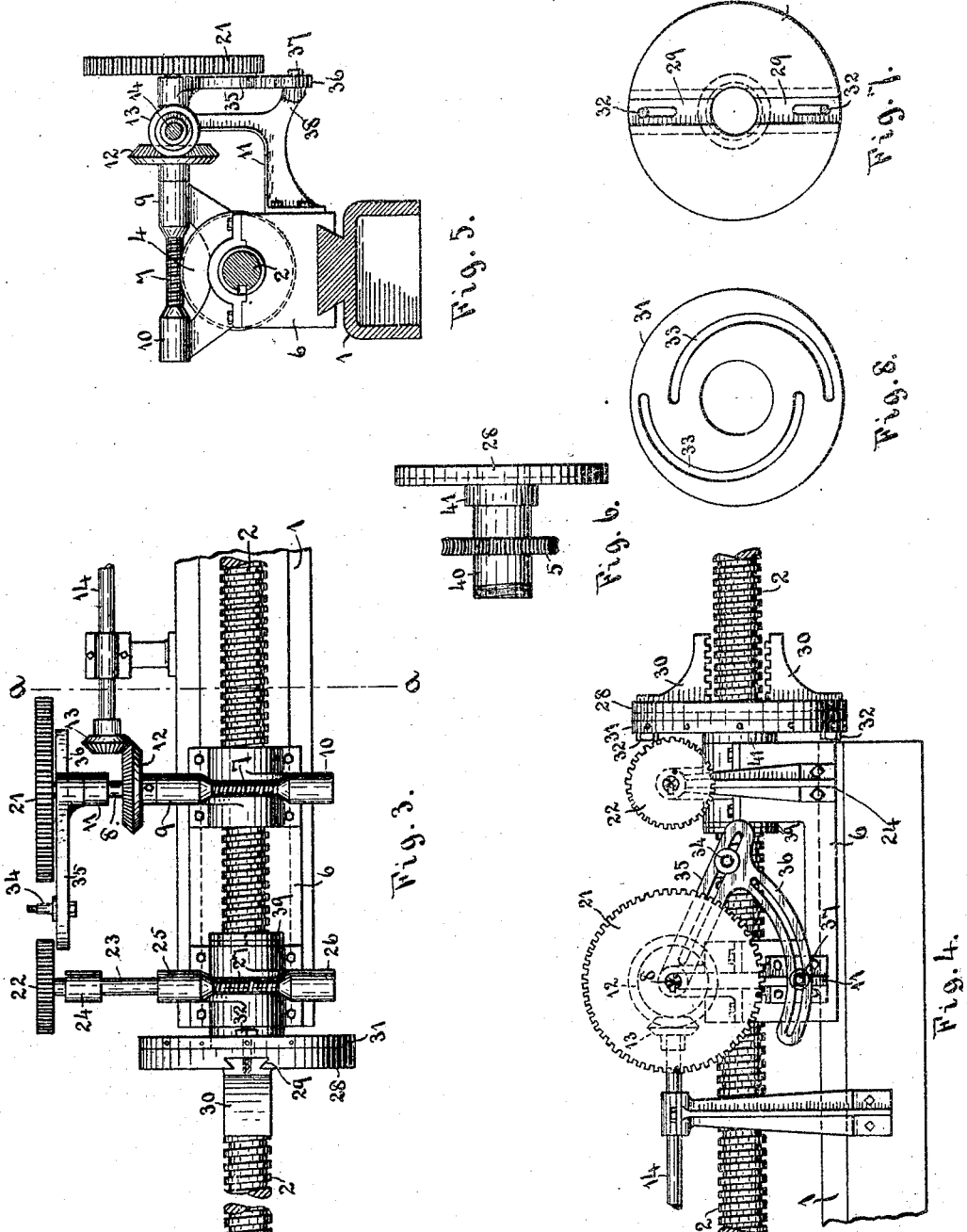
WITNESSES:
INVENTOR
James Bowen
BY
Eugene Diven
ATTORNEY

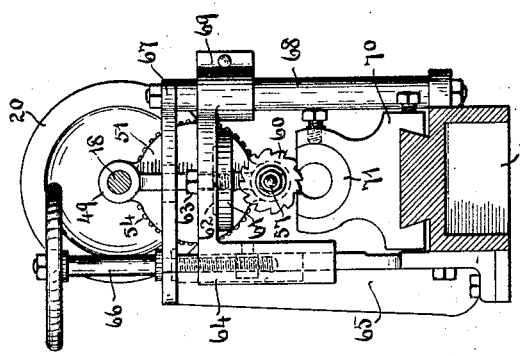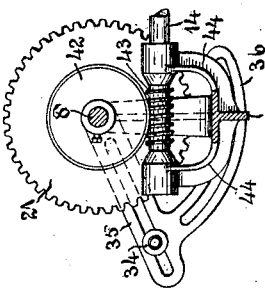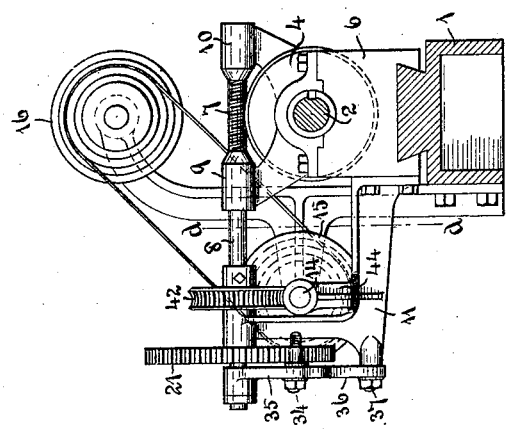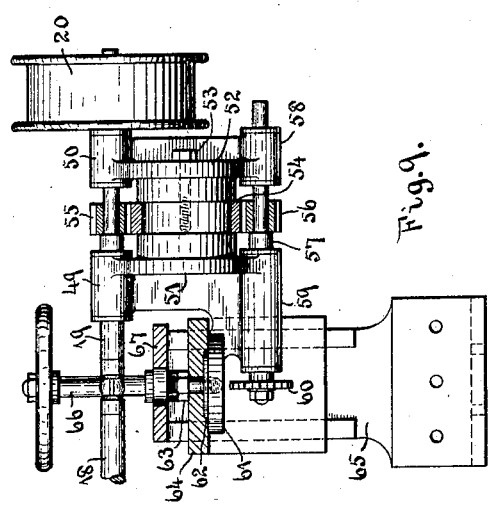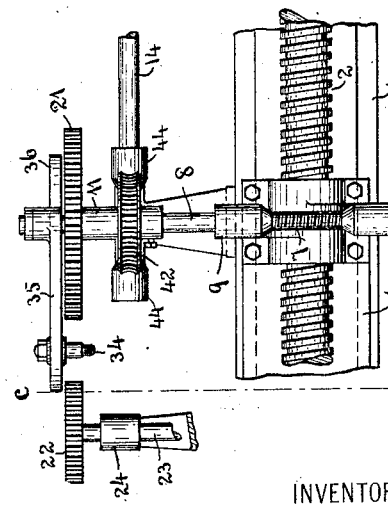

UNITED STATES PATENT OFFICE.

JAMES BOWEN, OF PHILADELPHIA, PENNSYLVANIA, ASSIGNOR TO SAYRE STAMPING COMPANY, OF SAYRE, PENNSYLVANIA.

MACHINE FOR CUTTING SCREWS, &c.

No. 893,431.     Specification of Letters Patent.     Patented July 14, 1908.

Application filed December 28, 1906. Serial No. 349,834.

*To all whom it may concern:*

Be it known that I, JAMES BOWEN, a citizen of the United States, residing at Philadelphia, in the county of Philadelphia and State of Pennsylvania, have invented certain new and useful Improvements in Machines for Cutting Screws, &c., of which the following is a specification.

This invention relates more particularly to improvements in machines wherein a rotating cutter is employed for cutting screw threads upon rods of considerable length, and for turning and finishing the surfaces of shafts, rolls and the like.

One object of my improvements is to provide a machine of this character which will accurately cut screws of long lengths, and which may also be employed to give a true and smooth finish to cylindrical surfaces of various shapes.

A further object is to so arrange the lead screw that the work will be directly driven thereby, and to provide a differential driving and feed mechanism whereby, with a minimum number of change gears of comparatively small diameters, the longitudinal travel of the lead screw may be perfectly regulated, with relation to its rotary motion, in conformity with any pitch of thread or width of cut which it may be desired to make: in other words, to render the machine universal;—capable of cutting all the different pitches and styles of screw threads, whether right or left hand, without changing the lead screw.

I attain my objects by constructing the machine in the manner illustrated in the accompanying drawings, in which—

Figure 1:
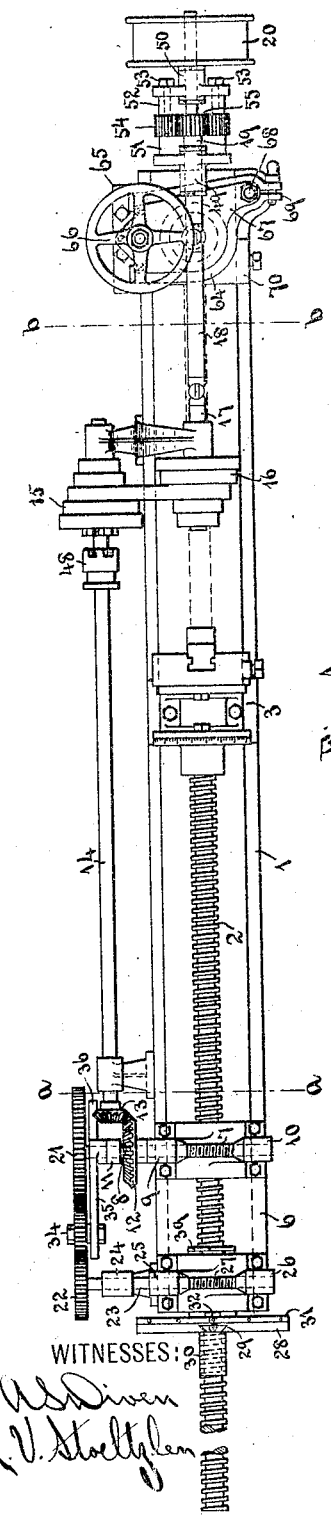
Figure 2:
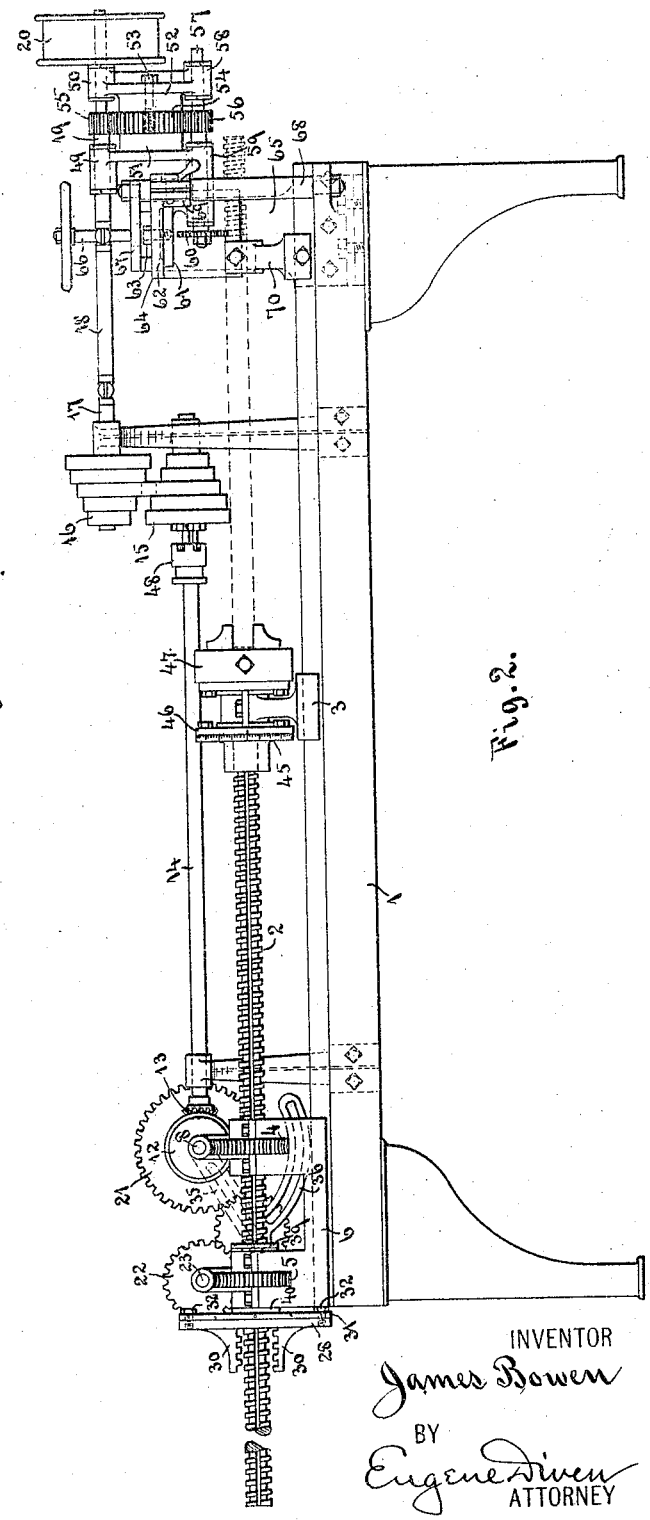

Figure 1 represents a plan view of my complete machine; Fig. 2, a front elevation thereof; Fig. 3, a plan view of the left hand end of the machine showing the lead screw and its driving and feed mechanism on a larger scale; Fig. 4, an elevation showing this portion of the machine, as viewed from the rear; Fig. 5, a section on the line $a$—$a$ in Figs. 1 and 3, looking to the left; Figs. 6, 7 and 8, details of the nut adjusting and turning mechanism; Fig. 9, a front elevation of the vertically and radially adjustable support, or carrier, for the cutting tool, parts being shown in central longitudinal section; Fig. 10, an end elevation of the same, looking to the right from line $b$—$b$ in Fig. 1; Fig. 11, a
plan view showing a modification of the lead
screw driving gear; Fig. 12, an end elevation thereof looking to the right from line $c$—$c$ in Fig. 11; and Fig. 13, a section on line $d$—$d$ in Fig. 12, looking to the left.

Like numerals designate like parts in the several views.

The machine comprises a bed 1 of suitable length supported on legs at the two ends and provided along its upper side with suitable guide-ways to receive the sliding parts of the machine. At a suitable distance above the bed, in a central longitudinal position is the lead screw 2, the right hand end of which rotates in a bearing formed on a carriage 3; the left hand end of the screw passing through hubs on worm wheels 4 and 5, which hubs are journaled in bearings formed on what may be termed the head-stock 6, which is rigidly fastened to the left hand end of the bed.

The worm wheel 4 is provided with a spline in its hub to engage a longitudinal groove on the lead screw, an end view of said spline being shown in Fig. 5, and it is rotated by means of the worm 7 mounted on the transverse shaft 8, which is journaled in the bearings 9 and 10 on the caps by which the worm wheel hub is held to its bearings in the head-stock 6. The outer end of shaft 8 is supported by a bracket 11 fastened to the back of the head-stock, and it is driven by means of the bevel gears 12 and 13, gear 13 being secured to the end of a longitudinal shaft 14 supported by brackets at the back of the machine. At the other end of shaft 14 is a cone pulley 15 which is belted to a cone 16 on the shaft 17 supported in a fixed bearing above the longitudinal center of the machine. Shaft 17 is driven from the main driving shaft 19 through an intermediate shaft 18 coupled to said two shafts by universal joints. The machine is driven by pulley 20 on shaft 19, which is belted to a suitably located counter shaft, or to any other source of power. This pulley might be placed on the shaft 17; but I prefer to place it on shaft 19, as by so doing the power is transmitted directly to the cutting tool from the pulley through strong driving gears and not through the necessarily weaker universal joints.

To advance the lead screw from left to right, so as to feed the work to the cutter with the required longitudinal motion, relative to its rotary motion, to produce the required pitch in the thread which is being cut, or any desired width of cut, I provide a revoluble nut to engage the lead screw. This nut is divided, in order that the screw may be released for a quick return to starting position, and it comprises the threaded jaws 30 slidably mounted in diametrically opposite dovetailed grooves 29 formed on the face of the disk 28, said disk being attached to the outer end of the hub 40 which carries the worm wheel 5. This hub is journaled in bearings formed at the left hand end of the head stock 6, the end thrust on said hub in either direction being taken up by the shoulder 41 on one side and the lock nuts 39 upon the other. The worm wheel 5 meshes with the worm 27 mounted in the bearings 25 and 26 formed on the caps of the hub bearings on the headstock, the worm shaft 23 projecting out to the rear and being supported by a bracket 24 fastened to the head stock. The shaft 23 is provided at its outer end with the gear wheel 22 in alinement with the gear wheel 21 on the outer end of the shaft 8, and, in order to transmit motion from shaft 8 to shaft 23, I provide one or more intermediate gears which are mounted on a movable pin or pins, as shown at 34, carried on a slotted arm 35 which is pivotally mounted upon shaft 8. In Figs. 1 and 2 an intermediate gear is shown in position on pin 34 to transmit motion from gear 21 to gear 22. The arm 35 is held in proper adjustment by means of the slotted arc 36, which is locked in position by a set screw 37 carried by a projection 38 on the bracket 11.

To place the nut jaws 30 in or out of engagement with the lead screw, I provide a disk 31 at the rear of disk 28, loosely mounted upon the shoulder 41 formed upon the hub. This disk 31 is provided with eccentric slots 33 through which set screws 32 are passed into the jaws 30 through radial slots provided therefor in the disk 28. By loosening these set screws and turning the disk 31 in one direction or the other, the cam slots 33 will cause the jaws 30 to move into or out of engagement with the lead screw.

When the nut jaws are out of engagement with the lead screw and the machine is in motion, it will be evident that simply a rotary motion will be imparted to the lead screw from the worm shaft 8. If now the nut jaws be thrown into engagement with the lead screw, and no connection is established between the shafts 8 and 23, the nut will remain stationary, being held so by the worm 27, and, as the lead screw is rotated, it will advance the work to the cutting tool with a longitudinal travel which will produce on the work blank a thread or cut of the same pitch as that of the lead screw. If, however, it is desired to produce on the blank a thread having a pitch less than that of the lead screw; that is to say, a greater number of threads to the inch a gear 22 of the proper relative diameter with respect to gear 21 will be placed on the shaft 23 and a suitable intermediate gear will be placed on the pin 34 and brought into mesh with gears 21 and 22, thereby transmitting motion from the shaft 8 to shaft 23 and causing the nut to rotate at a speed which will properly retard the longitudinal travel of the lead screw. Should the machine be required to cut a thread of greater pitch than that of the lead screw; that is, a less number of threads to the inch, then by placing a second intermediate gear on a pin secured in one of the slots on the arm 35, and meshing one intermediate gear with gear 21 and the other with gear 22, a reversed motion will be produced in the nut so that the travel of the lead screw will be hastened to an extent which will produce the required increase in pitch. It will thus be seen that, by the use of properly proportioned change gears, the lead screw may be given a longitudinal travel at a greater or less speed with relation to its rotation, thereby producing any desired thread pitch or width of cut, on the blank; this being accomplished through the differential action of the driving and feed gears upon the lead screw.

The speed of rotation of the lead screw is controlled, through the reducing gears 12 and 13, by means of the cone pulleys 15 and 16 which couple the shaft 14 to the driving shaft 17, the speed of the lead screw being hastened or retarded with relation to the speed of the cutting tool by shifting the belt on the cones 15 and 16 in accordance with the nature of the work to be done. Instead of using the bevel gears 12 and 13 to transmit reduced motion from shaft 14 to shaft 8, I may accomplish a greater reduction in motion between the shafts by employing a worm and worm wheel in place of these bevel gears; this modification being illustrated in Figs. 11, 12 and 13, in which the shaft 8 is shown provided with a worm wheel 42, which is driven by worm 43 on shaft 14; said shaft being journaled at each side of the worm in side arms 44 attached to the bracket 11, which supports the outer end of the shaft 8. By this modification I obtain the reducing motion from shaft 14 to the lead screw through worm 43, worm wheel 42, worm 7 and worm wheel 4. With either arrangement of reducing gears, combined with the worm drive on lead screw and nut, I provide in the lead screw a steady, slow and powerful rotary motion properly proportioned to the speed of the cutting tool to remove all inaccuracies due to lost motion in gear trains, and to permit a cut the full depth of the thread groove to be made at one operation without producing chatter at the tool. The speed of rotation is adapted to be changed, however, with relation to that of the cutting tool by means of the cones 15 and 16.

In order to attach the blank or other piece, upon which the work is to be performed, to the lead screw, I attach to the end of the lead screw a suitable chuck 47 said chuck being attached to a short arbor mounted on the carriage 3 and coupled to the end of the lead screw by means of the coupling disks 45 and 46. This arbor is made separate from the lead screw in order that, in screw cutting, multiple threads may be produced upon the blank. These disks are coupled together by any suitable means whereby one disk may be turned and set relatively to the other. The periphery of one of these disks is provided with a suitable scale and an index mark is provided on the periphery of the other disk. In cutting, for instance, a double thread, after the first thread has been cut, the lead screw will be released from the nut 30 and the carriage 3 moved back to the left to bring the blank in position to start the cutting tool in on a fresh cut. The coupling between disks 45 and 46 is then loosened and the disk 46 given a half turn with relation to the disk 45, thereby rotating the blank a half turn and bringing it in position for the cutter to mill out a thread groove between the spirals of the groove already cut. Disks 45 and 46 will then be again rigidly coupled together, the nut jaws 30 thrown into engagement with the lead screw and the lead screw again set in motion to feed the blank to the cutter. In the same manner, by properly adjusting the disk 46 with relation to the disk 45, a still greater number of threads or spirals may be formed on the blank.

In order that the lead screw may be thrown out of operation without stopping the main drive shaft, I mount the cone 15 loosely upon shaft 14 and provide a clutch, (as indicated at 48), whereby the shaft may be readily connected to or disconnected from the cone.

Cutting tool 60 is mounted upon the end of a shaft which is journaled in a carrier adapted to be raised or lowered, and also to be turned about the vertical diameter of the cutter, as an axis, to properly position the cutter to conform with the diameter and pitch of the screw thread or spiral cut to be produced upon a given piece of work; and also to adjust the tool to the required depth of cut. This carrier is composed of two parts 51 and 52, bolted together, and provided at the top with the journal boxes 49 and 50 for the main drive shaft 19, and at the under side with journal boxes 58 and 59 to carry the shaft 57, to the end of which the cutter 60 is attached. Motion is transmitted from driving shaft 19 to cutter shaft 57 by means of an intermediate gear 54, which meshes with gears 55 and 56, mounted, respectively on the shafts 19 and 57; the gear 54 being mounted on a bearing formed on the gear member 51, and retained in place by the member 52 when bolted into place by means of the bolts 53. The gear member 51 is provided, over the cutter, with a turntable plate 61, the center of which is in alinement with the vertical diameter of the cutter. This turntable plate is secured to the underside of a horizontal arm on the slide 64, which is adjustably mounted upon the standard 65 fastened to the bed of the machine at the back side. The turntable plate is provided upon its upper face with a cylindrical projection 62 which enters a circular recess, or socket, in the under side of the arm on slide 64; and it is held to place and secured in its adjusted positions by means of the set screw 63. Since the axis of this turntable plate coincides with the vertical diameter of the cutting tool it will be evident that, by loosening the set screw and turning the carrier in one direction or the other, the cutter may be set at any angle, with relation to the work, that may be required to produce a desired screw pitch or spiral cut thereon, whether right or left.

The slide 64 is raised and lowered upon the standard 65 by means of a hand wheel on the vertical adjusting screw 66 in the usual manner; and, in order to firmly brace the cutting tool, I provide at the front of the machine a post 68, which is engaged by a split sleeve 69 formed at the front end of the arm on slide 64, which sleeve is clamped to the post, when the carrier has been set in its proper vertical position, by means of a suitable clamping screw. The top of the post 68 is connected to the top of standard 65 by means of a brace plate 67. I thus provide a perfectly rigid support for the cutter, with means for locking the adjusting parts securely in place after the cutter has been properly set to perform the work required.

To hold the work in position beneath the cutter I provide a steady rest 70, having a cylindrical socket into which may be fitted one of a series of blocks 71, which will be bored to different diameters, to receive the bars or rods which form the blanks to be operated upon.

The main shaft 19 is coupled to the cone shaft 17 by means of the intermediate shaft 18 and universal joints, to permit of the vertical and horizontal adjustments of the carrier. The vertical adjustments are not extensive. The horizontal angular adjustments of the shaft 19, due to the swinging of the carrier from one side to the other on turntable 61, will throw the shaft considerably out of alinement with shaft 17. By positioning the center of the universal joint, which couples shaft 19 to shaft 18, in alinement with the vertical axis of the turntable 61, I maintain this joint in a fixed position horizontally, thereby maintaining the shafts 17 and 18 at all times in the same vertical plane. By this arrangement I reduce to a minimum the degree of displacement of said shafts. By setting the hub of pulley 20 a short distance away from the bearing 50, (a quarter of an inch will suffice), the shaft 19 will be permitted to slide in its bearings sufficiently to allow for the angular displacement of shaft 18 when raising and lowering the tool. No allowance need be made for the horizontal angular displacement of shaft 19, since the center of the universal joint between shafts 18 and 19 is in the pivotal axis.

When cutting left hand threads and spirals with this machine, no change in the direction of rotation of the lead screw will be necessary. The cutter will simply be placed at the required angle, by swinging the carrier toward the front of the machine, the direction of rotation of the driving shaft 19 continuing the same. The lead screw will be run out to the right until the left hand end of the blank is under the cutter. Then, by placing properly proportioned gears between shafts 8 and 23, the nut 30 will be given a left hand rotation more rapid than that of the lead screw, thereby causing said screw to travel toward the left, carrying the blank from right to left past the cutter at proper speed of travel to produce the desired angle of cut upon the blank.

I have adopted worms and worm wheels as the means for imparting motion from shafts 8 and 23 to the lead screw and feed nut, because, in so doing, I accomplish a great reduction in speed in the screw and nut and avoid the use of large and many membered gear trains, thereby eliminating the inaccuracies arising from the use of said trains. The worms, as I make the machine, are proportioned to run one hundred revolutions to one of the worm wheel, and I have found that these high speeds of the shafts 8 and 23, relative to the screw and nut, enable me to make the requisite changes in the gear train between said shafts to accomplish the differences in speed and direction of rotation between the screw and nut by the use of small change gears and comparatively few of them. Thus, for pitches running from 1 to the inch to 10 to the inch, twelve different pitches can be cut on this machine with the use of nine different change gears only, ranging from 120 teeth down to 24 teeth; and by adding six more change gears, all below 120 teeth, left-hand pitches within the same range may be cut.

By substituting a grinding wheel for the milling cutter, and properly adjusting the relative speed of said wheel to the work, a smooth and true surface finish may be produced.

The lead screw and differential driving and feed mechanism, as herein set forth, may be applied to various machines for doing many different kinds of work, and I do not confine myself, therefore, to the application thereof solely to the machine herein described, nor do I limit myself to the employment of a rotating cutting tool in connection therewith.

What I claim as my invention and desire to secure by Letters Patent is—

1. In a screw cutting machine, the combination of a lead screw, a horizontal bed above and parallel to which the lead screw is mounted, means for transmitting simultaneous rotary and longitudinal motions to the screw, means for changing the relative speeds of said rotary and longitudinal motions, a support for one end of the screw slidably mounted upon the bed, and means on said end of the screw for securing a piece of work thereto, whereby the required longitudinal and rotary motions will be transmitted to the work directly from the screw.

2. The combination, with a lead screw and driving mechanism for imparting rotary motion thereto, of a nut for imparting longitudinal motion to the screw, a worm wheel adapted to rotate the nut, a shaft provided with a worm to rotate the worm wheel, and means susceptible of change, whereby said shaft may be connected to the driving mechanism to impart to the nut different speeds of rotation relative to the rotary motion of the screw.

3. The combination, in a machine of the character described, of a tool support adapted to be adjusted to and from the work, a carrier pivotally mounted on said support with its pivotal axis intersecting the line of travel of the work, a shaft journaled on the carrier with its axis intersecting the pivotal axis of the carrier, a cutting tool on the shaft at the point of intersection of the axis of the shaft with said pivotal axis, a second shaft journaled on the carrier parallel with the first and geared thereto, a third shaft coupled to the second shaft by a universal joint, the center of said joint being positioned in said pivotal axis, a fourth shaft to which the third shaft is also coupled by a universal joint, mechanism for feeding the work to the cutting tool, a connection between said fourth shaft and the feed mechanism, and means for imparting motion to one of the carrier shafts from a source of power.

4. The combination, in a machine of the character described, of a pivotally mounted carrier adjustable to and from the work, the pivotal axis of the carrier intersecting the axis of the work at right angles, a shaft journaled on the carrier with its axis intersecting said pivotal axis, a cutting tool on the shaft at the point of intersection of said axes, a second shaft on the carrier parallel with and geared to the first, the axis of said second shaft also intersecting the pivotal axis, means for driving one of said shafts from a source of power, mechanism for feeding the work to the cutting tool, and a flexible connection between said second shaft and the feed mechanism.

In testimony whereof I have affixed my signature, in presence of two witnesses.

JAMES BOWEN.

Witnesses:
ROBERT J. BYRON,
EDMUND W. KIRBY.